July 22, 1958 — M. E. REYNOLDS — 2,844,046
TRACTOR BRAKE CONTROL
Filed Dec. 10, 1954

INVENTOR.
MERRILL E. REYNOLDS
BY
ATTORNEY

United States Patent Office 2,844,046
Patented July 22, 1958

2,844,046

TRACTOR BRAKE CONTROL

Merrill E. Reynolds, Moravia, N. Y.

Application December 10, 1954, Serial No. 474,448

2 Claims. (Cl. 74—542)

This invention relates to tractor brake control mechanism, and more particularly to an auxiliary foot-operated brake pawl actuator.

In tractors, the brakes are generally applied by foot pedals, one of which is provided with a ratchet and pawl for holding the brake applied. In one form of commercial application, the pawl is pivoted in the floor board and is adapted for manual operation. However manual operation is awkward, since the pawl must be operated while foot pressure is being applied to the pedal, and thus the operator with one foot on the brake pedal must lean forward to reach the pawl. The steering wheel however, tends to prevent the operator from leaning forward to any great extent, and the operation as a whole is difficult. The present invention is directed to an auxiliary apparatus to be applied to such tractors for actuating the brake pawl by the left foot, while the right foot holds the brake pedal depressed. The invention is further directed to such apparatus and the form thereof whereby it may be readily applied or installed on existing tractors, and thereby do away with the awkward and difficult operation of such pawl manually. The invention further is directed to an economical, rugged control mechanism capable of easy installation and operation.

The above and other novel features of the invention will appear more fully hereinafter from the following detailed description, when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
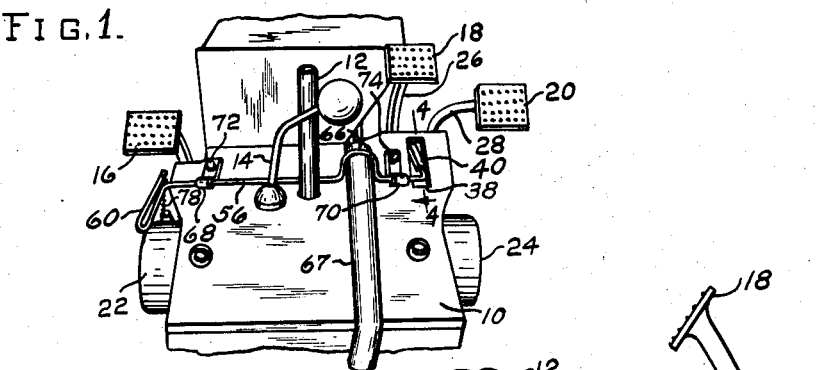
Figure 1 is a fragmentary perspective view directed downwardly from the rear toward the tractor foot controls.
Figure 2:
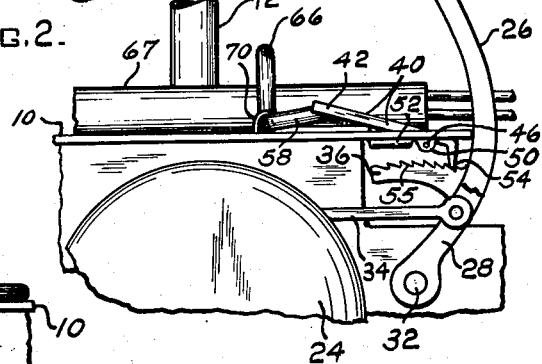
Figure 2 is a fragmentary right hand side elevation of the brake pedal and control.
Figure 3:
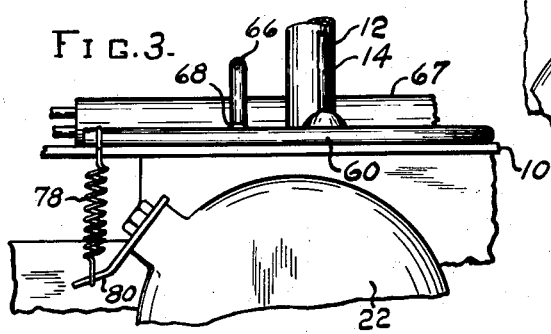
Figure 3 is a fragmentary left hand side elevation of the brake control.

Referring to Figure 1, there is shown the foot board or deck 10 of a tractor, with the steering column 12, gear shift 14 projecting therethrough. To the left is a clutch pedal 16, and to the right are brake pedals 18 and 20. The brake pedal 18 operates the left hand brake, while the pedal 20 operates the right hand brake. Provision is made whereby the operator may, if desired, lock both pedals 18 and 20 together for simultaneous brake operation if desired, as will be well understood in connection with tractors of the type made and sold by the International Harvester Company.

Beneath the deck 10 is a transmission and differential for driving the rear wheels, there being provided a brake for the drive to each of the rear wheels, the brake for the left wheel being located within the housing 22, and the brake for the right wheel being within the housing 24. The brake pedals 18 and 20 each have lever arms 26 and 28 pivoted about a common center, the pedal 18 and arm 26 being connected to the transverse rock shaft 32 extending across the tractor to operate the left brake in housing 22, while the pedal 20 and arm 28 are freely pivoted on the shaft 32, and directly connected to the right hand brake in housing 24 by linkage such as 34.

The brake pedal lever arm 26 is provided with an integral arcuate ratchet 36 located below the deck. Located in the deck adjacent thereto, is a rectangular aperture 38 in which is pivotally mounted a dog 40. The dog is of channel section having side flanges, as at 42. The side flanges have spaced ears as at 44 through which a transverse pivot pin 46 extends, the pivot pin being fixed in depending ears 48 and 50 formed integral with the deck and located on opposite sides of the aperture 38. A strap 52, integral with the deck and extending across the aperture 38, but offset below the deck, forms a support for the rearward portion of the dog 40, when the dog is in the released position and lying flush with the deck, as shown in Figure 4.

Figure 4:
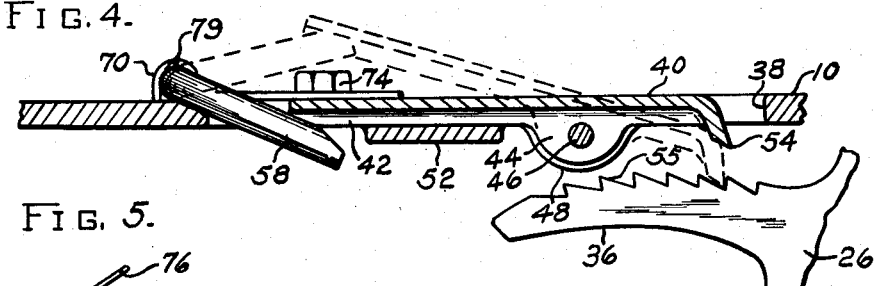
Figure 4 is an enlarged sectional view through the control, dog and brake ratchet, taken substantially on the line 4—4 of Figure 1.
Figure 5:
Figure 5 is a perspective view of the control rod.

The forward end of the dog is provided with a tooth 54, which is adapted to be rocked downward to engage the teeth 55 of the ratchet 36, it being understood that the dog may be manually rocked to the position indicated in dotted in Figure 4 for this purpose. When the tooth 54 is engaged with the ratchet, the brake pedal is positively held in brake-engaged position.

The structure thus far described is in common usage on tractors of the type referred to. The driver, to apply the brake, depresses the pedal by foot pressure and while holding the pedal depressed, must reach downward and lift the rear end of the dog 40 by hand, if it is desired to lock the brake in engaged position. With the conventional steering wheel located directly in front of the driver, this is an awkward operation, since to manually reach the dog, the operator must lean forward against the steering wheel. Once the brake pedal is locked in applied position, no difficulty is had in subsequently releasing the same, since release is effected by foot pressure on the rear portion of the dog to rock the dog, and lift the tooth 54 from engagement with the ratchet.

In order to facilitate actuation of the dog into operative brake-holding position, there is provided a rock shaft 56 extending crosswise of the deck, such shaft having a radial arm 58 at one end extending beneath the rear end of the dog channel, and a foot treadle 60 at the other end, adapted for operation by the left foot, while the brake pedal 18 is temporarily held by the right foot.

The rock shaft may be formed of a single piece of circular cross section bar stock or rod, one end having a portion bent at a right angle to form the arm 58, while the other end is bent at a right angle as at 62, and then bent double as at 64 to form a T end, or treadle 60. The intermediate portion of the bar may be provided with a loop offset such as 66 to clear fixtures upon the deck such as 67, and the bar is provided with spaced straps or brackets 68 and 70 forming bearings, which in practice may be secured to threaded studs 72 and 74 in the deck. In practice, studs already in use for some other purpose may be removed and replaced by studs of added length to serve the dual purpose of securing the straps to the deck, as well as such other purpose.

Figure 6:
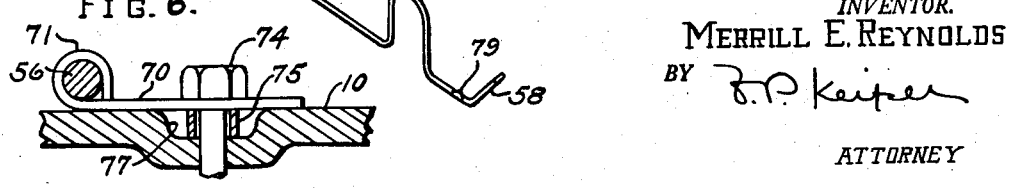
Figure 6 is a fragmentary sectional view through a bearing bracket or strap.

In Figure 6, the strap or bracket 70 is shown, with an end rolled as at 71 to embrace the rod 56, and form a bearing. If the head of the bolt 74 was countersunk as at 77 in the deck, a sleeve 75 is provided in connection with the longer bolt.

The free end of the bar forming the treadle is drilled as at 76, and a tension spring 78 extending to a lug 80 on the brake housing 22 serves to yieldingly hold the rock shaft in the position shown in Figure 4. The shaft is held against endwise movement by two projections such as 79, formed in the rod, and adapted to engage one or both of the rolled loops 71 of the straps 68 and 70 in opposed relation. The arm 58 is adapted to project into the deck aperture 38 and beneath the rear portion of the dog 40, so that by rocking the shaft, the dog will be lifted to the ratchet-engaged position idicated in dotted in Figure 4. Applying the brake is accordingly effected by pressure from the operator's right foot, and while the brake is held in engaged position, the treadle 60 is rocked by the left foot to engage the dog in the ratchet. Thereafter, release of the dog is had in the normal manner by pressure on the rear upper surface of the dog by the operator's foot, the rock shaft having been previously returned to the position shown in Figure 4 by the return spring.

It will be seen that the rock shaft is readily applied to tractors of the type referred to and at once renders such tractors safe, in that the brake may be set solely by combined foot operation in a convenient manner. The previous difficulty and awkwardness of actuating the dog by manually reaching for the same is overcome, with the result that the operator will set the brake or brakes of the tractor, rather than to leave the tractor in an unsafe condition with the brakes released, as is the tendency resulting where manual operation is required, of the pawl or dog 40.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A pawl actuating accessory for application to a tractor having a floor plate, a foot brake having a ratchet sector beneath said floor plate, and a pivoted pawl in said floor plate for engaging the ratchet, comprising a one piece rock shaft having a central section adapted to extend across the floor plate, said central section at one end having an end portion bent at a right angle to form an arm for engagement beneath the pawl and at its other end, a portion bent at right angles, and reverse bent to form a treadle and extending across the axis of the central section, the free end thereof being adapted to receive a tension spring, said treadle and said arm lying substantially in the same plane, and spaced support straps for said rock shaft, each strap having one end rolled about the rod to form a bearing, and the other end adapted to be secured to said floor plate, said central section being of a length whereby said treadle may be located beyond the edge of the floor plate when the rock shaft is secured in place to the floor plate by said straps.

2. A pawl actuating accessory for application to a tractor having a floor plate, a foot brake having a ratchet sector beneath said floor plate, and a pivoted pawl in said floor plate for engaging the ratchet, comprising a one piece rock shaft having a central section adapted to extend across the floor plate, said central section at one end having an end portion bent at a right angle to form an arm for engagement beneath the pawl and at its other end, a portion bent at right angles, and reverse bent to form a treadle and extending across the axis of the central section, the free end thereof being adapted to receive a tension spring, said treadle and said arm lying substantially in the same plane, and spaced support straps for said rock shaft, each strap having one end rolled about the rod to form a bearing, and the other end adapted to be secured to said floor plate, said central section being of a length whereby said treadle may be located beyond the edge of the floor plate when the rock shaft is secured in place to the floor plate by said straps, said central section having an offset loop located intermediate said straps for clearing floor plate mounted fixtures, said loop lying in a plane substantially transverse of the plane of said bent ends.

References Cited in the file of this patent

UNITED STATES PATENTS

| | | |
|---|---|---|
| 1,444,027 | Frederick et al. | Feb. 6, 1923 |
| 2,088,182 | Verch | July 27, 1937 |
| 2,388,002 | Maiwald | Oct. 30, 1945 |
| 2,485,759 | Miller | Oct. 25, 1949 |
| 2,504,258 | Elenewicz | Apr. 18, 1950 |
| 2,553,119 | Sprick | May 15, 1951 |
| 2,674,901 | Boge | Apr. 13, 1954 |